(12) United States Patent
Tiwari et al.

(10) Patent No.: US 11,785,450 B2
(45) Date of Patent: Oct. 10, 2023

(54) METHOD AND SYSTEM FOR PROVIDING NON-ACCESS STRATUM (NAS) MESSAGE PROTECTION

(71) Applicant: Samsung Electronics Co., Ltd., Suwon-si (KR)

(72) Inventors: Kundan Tiwari, Bangalore (IN); Rajavelsamy Rajadurai, Bangalore (IN); Narendranath Durga Tangudu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 17/605,549

(22) PCT Filed: Apr. 23, 2020

(86) PCT No.: PCT/KR2020/005362
§ 371 (c)(1),
(2) Date: Oct. 21, 2021

(87) PCT Pub. No.: WO2020/218843
PCT Pub. Date: Oct. 29, 2020

(65) Prior Publication Data
US 2022/0174483 A1    Jun. 2, 2022

(30) Foreign Application Priority Data

Apr. 25, 2019   (IN) .............................. 201941016468
Mar. 18, 2020   (IN) .............................. 201941016468

(51) Int. Cl.
*H04W 12/03*       (2021.01)
*H04W 12/033*      (2021.01)
(Continued)

(52) U.S. Cl.
CPC ......... *H04W 12/033* (2021.01); *H04W 12/06* (2013.01); *H04W 48/18* (2013.01); *H04W 60/00* (2013.01); *H04W 84/042* (2013.01)

(58) Field of Classification Search
CPC ... H04W 12/033; H04W 12/06; H04W 48/18; H04W 60/00
(Continued)

(56) References Cited

U.S. PATENT DOCUMENTS 10,455,491 B2   10/2019   Kim et al.
2012/0044869 A1  2/2012   Tiwari
(Continued)

FOREIGN PATENT DOCUMENTS

WO    2016/126093 A1    8/2016

OTHER PUBLICATIONS

"3rd Generation Partnership Project; Technical Specification Group Core Network and Terminals; Non-Access-Stratum (NAS) protocol for 5G System (5GS); Stage 3 (Release 16)", 3GPP TS 24.501 V16.0.2 (Mar. 2019), 480 pages.
(Continued)

*Primary Examiner* — Joel Ajayi (57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Accordingly the embodiments herein provides a method and system for ciphering of initial NAS message protection procedure. A UE is registered to a first PLMN and
(Continued)

a first 5G NAS security context has been established. The UE selects a second PLMN. The UE sends Initial Registration procedure with only cleartext IE to the second PLMN. The second PLMN may initiate and perform authentication procedure. The second PLMN initiates NAS Security mode control procedure and sends a Security Mode Command message containing the selected NAS ciphering method to the UE. The UE sends entire the Registration Request message containing both cleartext IE(s) and non-cleartext IE(s) using the NAS ciphering method sent in the Security Mode Complete message. The second PLMN send Registration Accept message.

4 Claims, 7 Drawing Sheets

(51) Int. Cl.
  *H04W 12/06* (2021.01)
  *H04W 48/18* (2009.01)
  *H04W 60/00* (2009.01)
  *H04W 84/04* (2009.01)

(58) Field of Classification Search
  USPC .......................................................... 455/411
  See application file for complete search history.

(56) References Cited

U.S. PATENT DOCUMENTS

2016/0127884 A1  5/2016 Kim et al.
2016/0345151 A1  11/2016 Chen

OTHER PUBLICATIONS

"3rd Generation Partnership Project; Technical Specification Group Services and System Aspects; Security architecture and procedures for 5G system (Release 15)", 3GPP TS 33.501 V15.4.0 (Mar. 2019), 187 pages.
Supplementary European Search Report dated Oct. 25, 2022 in connection with European Patent Application No. 20 79 5733, 7 pages.
"3rd Generation Partnership Project; Technical Specification Group Core Network and Terminals; Non-Access-Stratum (NAS) protocol for 5G System (5GS); Stage 3 (Release 15)", 3GPP TS 24.501 V15.2.1 (Jan. 2019), 455 pages.
"3rd Generation Partnership Project; Technical Specification Group Core Network and Terminals; Non-Access-Stratum (NAS) functions related to Mobile Station (MS) in idle mode (Release 16)", 3GPP TS 23.122 V16.1.0 (Mar. 2019), 66 pages.
"3rd Generation Partnership Project; Technical Specification Group Services and System Aspects; Security architecture and procedures for 5G system (Release 15)", 3GPP TS 33.501 V15.5.0 (Jun. 2019), 190 pages.
"3rd Generation Partnership Project; Technical Specification Group Services and System Aspects; Security architecture and procedures for 5G system (Release 16)", 3GPP TS 33.501 V16.0.0 (Sep. 2019), 196 pages.
Huawei, HiSilicon, "Correction on UE behaviour in 5GMM-Registered.PLMN-Search", Change Request, 3GPP TSG-CT WG1 Meeting #117, May 13-17, 2019, C1-193295, 2 pages.
International Search Report dated Jul. 30, 2020 in connection with International Patent Application No. PCT/KR2020/005362, 3 pages.
Written Opinion of the International Search Authority dated Jul. 30, 2020 in connection with International Patent Application No. PCT/KR2020/005362, 5 pages.
Office Action dated Mar. 24, 2021 in connection with India Patent Application No. 201941016468, 4 pages.

METHOD AND SYSTEM FOR PROVIDING NON-ACCESS STRATUM (NAS) MESSAGE PROTECTION

CROSS-REFERENCE TO RELATED APPLICATIONS

This application is a 371 of International Application No. PCT/KR2020/005362 filed on Apr. 23, 2020, which claims priority to India Patent Application No. 201941016468 filed on Apr. 25, 2019, and India Patent Application No. 201941016468 filed on Mar. 18, 2020, the disclosures of which are herein incorporated by reference in their entirety.

BACKGROUND

1. Field

The present invention relates to a method and system for ciphering of initial Non-Access Stratum (NAS) message protection procedure and more specifically, the invention defines method and system for providing NAS message protection. The present application is based on, and claims priority from an Indian Application Number 201941016468 filed on 25 Apr. 2019, the disclosure of which is hereby incorporated by reference herein.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A User Equipment (UE) initiates registration procedure to register to a Public Land Mobile Network (PLMN) by sending a registration request message. The registration request message contains sensitive user information(s). In conventional art, initial NAS message protection mechanism has been introduced to provide the encryption of the sensitive data.

According to the current 3GPP TS 33.501, ciphering of NAS message is optional feature (but highly recommended to enable ciphering) and is based on a local regulatory requirement. If the local regulatory requirement mandates to send NAS message ciphered then all the operators should perform ciphering in that region. Similarly, if the local regulation mandates not to do ciphering, then the operator will use NULL ciphering procedure which is performing ciphering using NULL ciphering method (NEA0).

According to the current 3GPP TS 33.501, if the 5G NAS context exists then the UE shall send an initial NAS message ciphered in a NAS message container of the initial NAS message using the ciphering method of a 5G NAS security context.

In an example embodiment, the UE is registered to a first PLMN and 5G NAS security context has been established for the UE by the first PLMN according to the local policy of the operator or local regulation of the country to which the PLMN belongs. In this case, when the UE selects a second PLMN (e.g. in a PLMN of different country) in CM-IDLE mode, it registers to the second PLMN by initiates the transition from CM-IDLE to CM-CONNECTED state by transmission of an initial NAS message (Registration Request, Service Request or Deregistration Request). Then the UE uses NAS ciphering method of 5G NAS security context to cipher the non-cleartext Information Element(s) IE (i.e. sensitive information). In case the first PLMN supports and enables only NULL ciphering method (NEA0), then 5G NAS security context consists of a NULL ciphering method (NEA0). When the UE selects the second PLMN, where the second PLMN belongs to a region with regulations mandating ciphering and performs registration procedure to the second PLMN, then the UE uses the NULL ciphering method to cipher the non-cleartext IEs and thereby not complying with local regulation requirements. Also, a man in the middle can read the non-cleartext IEs i.e. sensitive data of the user and therefore leading to revelation of sensitive data of the user.

Also in some cases the security policy (e.g. Ciphering method) of the first PLMN may not be supported in the second PLMN. In this case it is not clear how the UE will use the 5G NAS security context created of the first PLMN when registering to the second PLMN, when the UE selects the second PLMN in CM-IDLE and RM-REGISTERED mode.

Thus, it is desired to address the above mentioned shortcomings or at least provide a useful alternative.

SUMMARY

Accordingly the embodiments herein discloses a method and system for providing NAS message protection. The method comprises registering a UE to a first PLMN; selecting, by the UE, a second PLMN; and initiating, by the UE, a registration procedure by sending a first registration request to the second PLMN, wherein the first registration request comprises a cleartext information element (IE). In an embodiment if the UE determines that a 5G NAS security method selected is 5G-EA0, then the first registration request comprises only clear text IE.

In another embodiment, the method further comprises receiving, by the UE, an authentication Request from the second PLMN in response to the first registration request, and receiving, by the UE, a security mode command from the second PLMN, wherein the security mode command message comprises a NAS ciphering method for the UE. The method further comprises sending, by the UE, a second registration request to the second PLMN, wherein the second registration request comprises a cleartext IE and a non-cleartext IE ciphered using the NAS ciphering method received from the second PLMN and receiving, by the UE, a registration accept message from the at least second PLMN.

In yet another embodiment, initiating the registration procedure comprises determining by the UE, whether the second PLMN allows reuse of a 5G NAS security context of other PLMN, wherein the UE is configured with the 5G NAS security context reuse configuration, and initiating the registration procedure by sending the first registration request to the second PLMN, wherein registration request comprises the cleartext information element (IE) in response to determining that the second PLMN does not allow reuse of the 5G NAS security context.

In yet another embodiment, initiating the registration procedure comprises determining by the UE, whether the second PLMN allows reuse of a 5G NAS security context of other PLMN, wherein the UE is configured with the 5G NAS security context reuse configuration, and sending a second registration request to the second PLMN, wherein the second registration request comprises the cleartext IE and a non-cleartext IE ciphered using a ciphering method of the 5G NAS security context, in response to determining that the second PLMN allows reuse of the 5G NAS security context.

In another embodiment initiating the first registration comprises sending, by the UE, a registration request ciphered comprising a ciphering method identifier of a current 5G NAS security context, receiving, by the UE, a registration Reject message from the second PLMN in response to the registration request, and initiating, by the UE, the registration procedure by sending a first registration request to the second PLMN, wherein registration request comprises a cleartext information element (IE).

In yet another embodiment the method further comprises receiving, by the UE an authentication request from the second PLMN in response to the first registration request, receiving, by the UE, a security mode command from the second PLMN, wherein the security mode command message comprises a NAS ciphering method for the UE, sending, by the UE, a second registration request to the second PLMN, wherein the second registration request comprises the cleartext IE and a non-cleartext IE ciphered using the NAS ciphering method received from the second PLMN, and receiving, by the UE, a registration accept message from the at least second PLMN.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide a method and system for providing NAS message protection.

Another object of the invention is to send a first registration request to the second PLMN, wherein the first registration request comprises a cleartext information element (IE).

Another object of the invention is to receive a security mode command from the second PLMN, wherein the security mode command message comprises a NAS ciphering method for the UE.

Another object of the invention is to send a second registration request comprising a cleartext IE and a non-cleartext IE ciphered using the NAS ciphering method received from the second PLMN.

Another object of the invention herein is to determine whether the second PLMN allows reuse of a 5G NAS security context of other PLMN, and wherein the UE is configured with the 5G NAS security context reuse configuration.

Another object of the invention herein is to directly send the second registration request to the second PLMN with cleartext IEs and non-cleartext IEs when the second PLMN allows reuse of a 5G NAS security context of other PLMN.

BRIEF DESCRIPTION OF THE DRAWINGS

This method and system is illustrated in the accompanying drawings, throughout which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provides a method and system for ciphering of initial NAS message protection procedure. A UE is registered to a first PLMN and a first 5G NAS security context has been established. The UE selects a second PLMN. The UE sends Initial Registration procedure with only cleartext IE to the second PLMN. The second PLMN may initiate and perform authentication procedure. The second PLMN initiates NAS Security mode control procedure and sends a Security Mode Command message containing the selected NAS ciphering method to the UE. The UE sends entire the Registration Request message containing both cleartext IE(s) and non-cleartext IE(s) using the NAS ciphering method sent in the Security Mode Complete message. The second PLMN send Registration Accept message.

Referring now to the drawings, and more particularly to FIGS. 1 through 7b, where similar reference characters denote corresponding features consistently throughout the figures, there are shown preferred embodiments.

Figure 1:
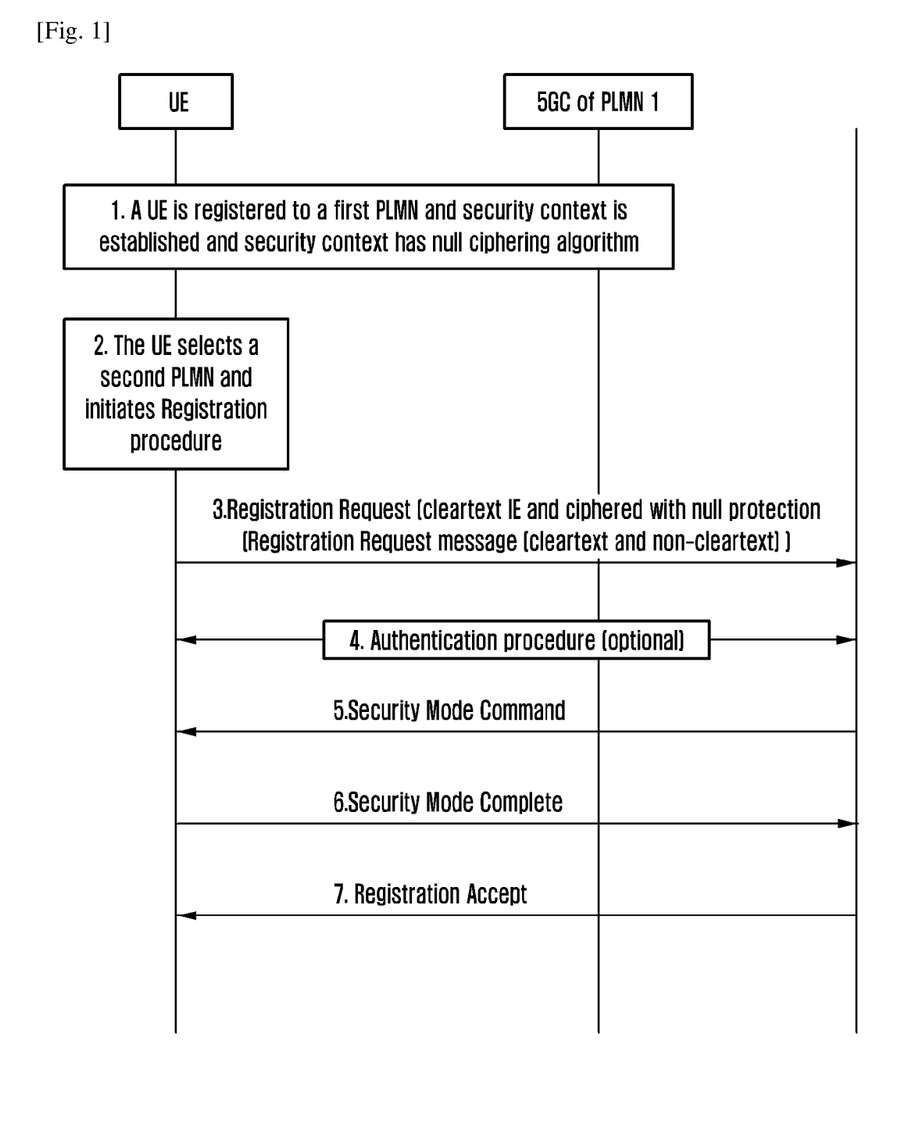
FIG. 1 is sequential diagram illustrating a registration procedure by a UE to a second PLMN, according to the prior art.

Abbreviations used in this disclosure and an expansion of the abbreviations are given below:

5GC 5G Core Network
5GLAN 5G Local Area Network
5GS 5G System
5G-AN 5G Access Network
5G-EIR 5G-Equipment Identity Register
5G-GUTI 5G Globally Unique Temporary Identifier
5G-BRG 5G Broadband Residential Gateway
5G-CRG 5G Cable Residential Gateway
5G-RG 5G Residential Gateway
5G-S-TMSI 5G S-Temporary Mobile Subscription Identifier
5QI 5G QoS Identifier
AF Application Function
AMF Access and Mobility Management Function
AS Access Stratum
ATSSS Access Traffic Steering, Switching, Splitting
ATSSS-LL ATSSS Low-Layer
AUSF Authentication Server Function
BSF Binding Support Function
CAG Closed Access Group
CAPIF Common API Framework for 3GPP northbound APIs
CHF Charging Function
CP Control Plane
DL Downlink
DN Data Network
DNAI DN Access Identifier
DNN Data Network Name
DRX Discontinuous Reception
ePDG evolved Packet Data Gateway
EBI EPS Bearer Identity
FAR Forwarding Action Rule
FN-BRG Fixed Network Broadband RG
FN-CRG Fixed Network Cable RG
FN-RGFixed Network RG
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
I-SMF Intermediate SMF
LADN Local Area Data Network
LBO Local Break Out (roaming)
LMF Location Management Function
LRF Location Retrieval Function
MCX Mission Critical Service
MDBVMaximum Data Burst Volume
MFBR Maximum Flow Bit Rate
MICO Mobile Initiated Connection Only
MPS Multimedia Priority Service MPTCP Multi-Path TCP Protocol
N3IWF Non-3GPP InterWorking Function
NAI Network Access Identifier
NEF Network Exposure Function
NF Network Function
NGAP Next Generation Application Protocol
NID Network identifier
NPN Non-Public Network
NR New Radio
NRF Network Repository Function
NSI IDNetwork Slice Instance Identifier
NSSAINetwork Slice Selection Assistance Information
NSSF Network Slice Selection Function
NSSP Network Slice Selection Policy
NWDAF Network Data Analytics Function
PCF Policy Control Function
PDR Packet Detection Rule
PDU Protocol Data Unit
PEI Permanent Equipment Identifier
PER Packet Error Rate
PFD Packet Flow Description
PPD Paging Policy Differentiation
PPF Paging Proceed Flag
PPI Paging Policy Indicator
PSA PDU Session Anchor
QFI QoS Flow Identifier
QoE Quality of Experience
(R)AN (Radio) Access Network
RG Residential Gateway
RQA Reflective QoS Attribute
RQI Reflective QoS Indication
RSN Redundancy Sequence Number
SA NR Standalone New Radio
SBA Service Based Architecture
SBI Service Based Interface
SCP Service Communication Proxy
SD Slice Differentiator
SEAF Security Anchor Functionality
SEPP Security Edge Protection Proxy
SMF Session Management Function
SMSF Short Message Service Function
SN Sequence Number
SNPN Stand-alone Non-Public Network
S-NSSAI Single Network Slice Selection Assistance Information
SSC Session and Service Continuity
SSCMSP Session and Service Continuity Mode Selection Policy
SST Slice/Service Type
SUCI Subscription Concealed Identifier
SUPI Subscription Permanent Identifier
TNAN Trusted Non-3GPP Access Network
TNAP Trusted Non-3GPP Access Point
TNGF Trusted Non-3GPP Gateway Function
TNL Transport Network Layer
TNLA Transport Network Layer Association
TSC Time Sensitive Communication
TSN Time Sensitive Networking
TSP Traffic Steering Policy
UDM Unified Data Management
UDR Unified Data Repository
UDSF Unstructured Data Storage Function
UL Uplink
UL CL Uplink Classifier
UPF User Plane Function
URLLC Ultra Reliable Low Latency Communication
URRP-AMF UE Reachability Request Parameter for AMF
URSP UE Route Selection Policy
VID VLAN Identifier
VLAN Virtual Local Area Network
W-5GAN Wireline 5G Access Network
W-5GBAN Wireline BBF Access Network
W-5GCAN Wireline 5G Cable Access Network
W-AGF Wireline Access Gateway Function FIG. 1 is sequential diagram illustrating a registration procedure by a UE to a second PLMN, according to the prior art;

As seen in FIG. 1, at 1, a UE 200 is registered to a first PLMN 110. Then at 2, the UE 200 selects a second PLMN 120 and initiates the registration procedure with the second PLMN 120 at 3. However as seen in FIG. 1, the registration request sent to the second PLMN 120 comprises cleartext and non-cleartext information element (IE). This poses a threat to the information. Anyone can read the non-cleartext IEs i.e. sensitive data of the user and therefore leading to revelation of sensitive data of the user. Thus the current invention provides a solution to this problem by sending only cleartext IEs.

Figure 2:
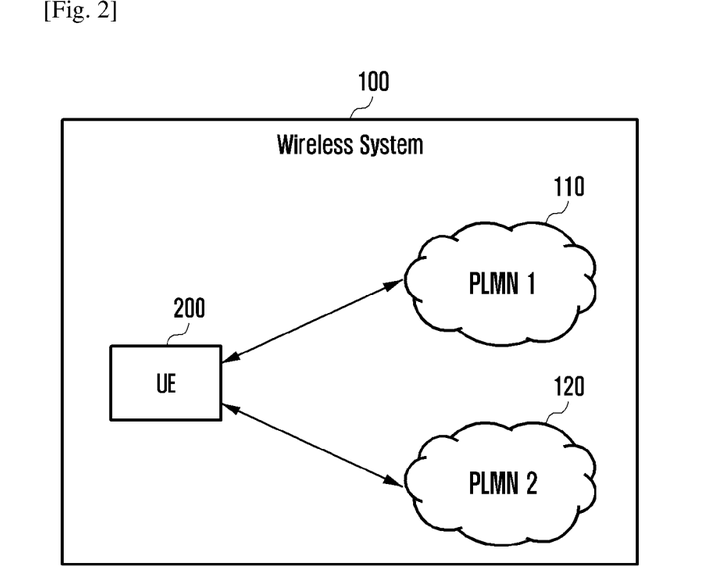
FIG. 2 is block diagram illustrating a wireless system for initial NAS message protection procedure, according to the embodiments as disclosed herein.

FIG. 2 is block diagram illustrating a wireless system 100 for initial NAS message protection procedure, according to the embodiments as disclosed herein.

As seen in FIG. 2, the wireless system 100 comprises the first PLMN (PLMN 1) 110, the second PLMN (PLMN 2) 120 and the UE 200. The UE 200 and the first PLMN 110 and the second PLMN 120 interact with each other for protection of initial NAS message.

The UE 200 can be, for example, but not limited to a cellular phone, a smart phone, a Personal Digital Assistant (PDA), a tablet computer, a laptop computer, a smart social robot, a smart watch, a music player, a video player, an Internet of things (IoT) device or the like.

Although the FIG. 2 shows various hardware components of the wireless system 100 but it is to be understood that other embodiments are not limited thereon. In other embodiments, the wireless system 100 may include less or more number of components. Further, the labels or names of the components are used only for illustrative purpose and does not limit the scope of the invention. One or more components can be combined together to perform same or substantially similar function to handle the multi pipe creation in the wireless communication system.

Figure 3:
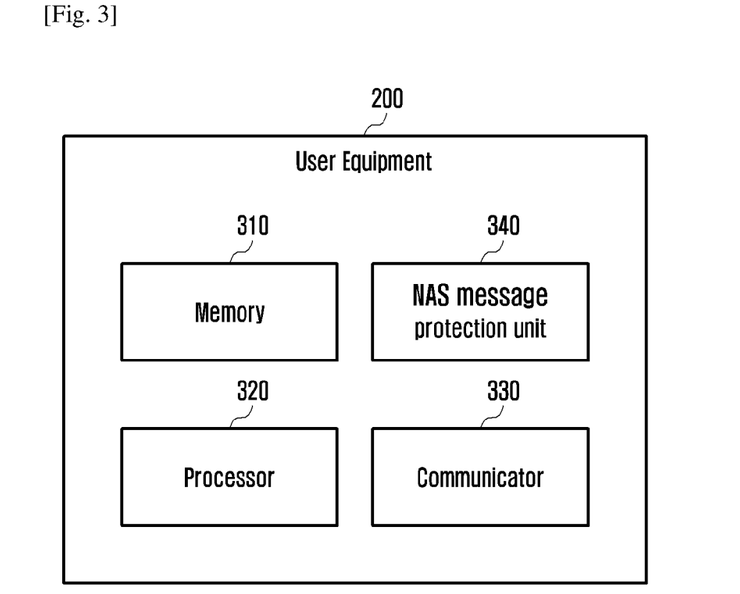
FIG. 3 is block diagram illustrating a UE for the initial NAS message protection procedure, according to the embodiments as disclosed herein.

FIG. 3 is block diagram illustrating the UE 200 for the initial NAS message protection procedure, according to the embodiments as disclosed herein. The UE 200 can be, for example, but not limited to a cellular phone, a smart phone, a Personal Digital Assistant (PDA), a tablet computer, a laptop computer, a smart social robot, a smart watch, a music player, a video player, an Internet of things (IoT) device or the like.

In an embodiment, the UE 200 comprises a memory 310, a processor 320, a communicator 330, and a NAS message protection unit 340.

The NAS message protection unit 340 is coupled with the memory 310, the processor 320 and the communicator 330 and is responsible for protection of initial NAS message.

The processor 320 is configured to execute instructions stored in the memory 310 and to perform various processes. The memory 310 stores instructions to be executed by the processor 310. The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may, in some examples, be considered a non-transitory storage medium. The term "non-transitory" may indicate that the storage medium is not embodied in a carrier wave or a propagated signal. However, the term "non-transitory" should not be interpreted that the memory 310 is non-movable. In some examples, the memory 310 can be configured to store larger amounts of information than the memory. In certain examples, a non-transitory storage medium may store data that can, over time, change (e.g., in Random Access Memory (RAM) or cache).

In an embodiment, the UE 200, is registered to the first PLMN 110. Then the UE 200 selects the second PLMN 120 and initiates a registration procedure by sending a first registration request to the second PLMN 120. The first registration request comprises a cleartext information element (IE) only. In an embodiment, the first registration request message contains cleartext IE only if the UE 200 determines that a 5G NAS ciphering method selected is 5G-EA0. In an example embodiment the a 5G NAS ciphering method selected may be any other method (e.g. 128-5G-EA1-3).

The UE 200 is further configured to send a second registration request to the second PLMN 120, wherein the second registration request comprises a cleartext IE and a non-cleartext IE ciphered using the NAS ciphering method received from the second PLMN 120.

In an another embodiment after selecting the second PLMN 120, the UE 200 determines whether the second PLMN 120 allows reuse of a 5G NAS security context of any other PLMN. If the second PLMN 120 allows reuse of a 5G NAS security context, then the UE 200 initiates the registration procedure by sending a first registration request to the second PLMN 120 using the 5G NAS security context i.e. the UE sends the Registration Request message containing cleartext and non-cleartext IE ciphered with ciphering method of the 5G NAS security context established in the last registered PLMN. However if the UE 200 determines that the second PLMN 120 does not allows reuse of a 5G NAS security context established in any other PLMN, then the UE 200 sends the second registration request to the second PLMN 120 without using the 5G NAS security context.

In yet another embodiment, after selecting the second PLMN 120, the UE 200 sends a registration request ciphered comprising a ciphering method identifier of a current 5G NAS security context to the second PLMN 120 and then the UE 200 initiates the registration procedure by sending the first registration request to the second PLMN 120.

Although the FIG. 3 shows various hardware components of the UE 200 but it is to be understood that other embodiments are not limited thereon. In other embodiments, the UE 200 may include less or more number of components. Further, the labels or names of the components are used only for illustrative purpose and does not limit the scope of the invention. One or more components can be combined together to perform same or substantially similar function to provide initial NAS message protection.

Figure 4:
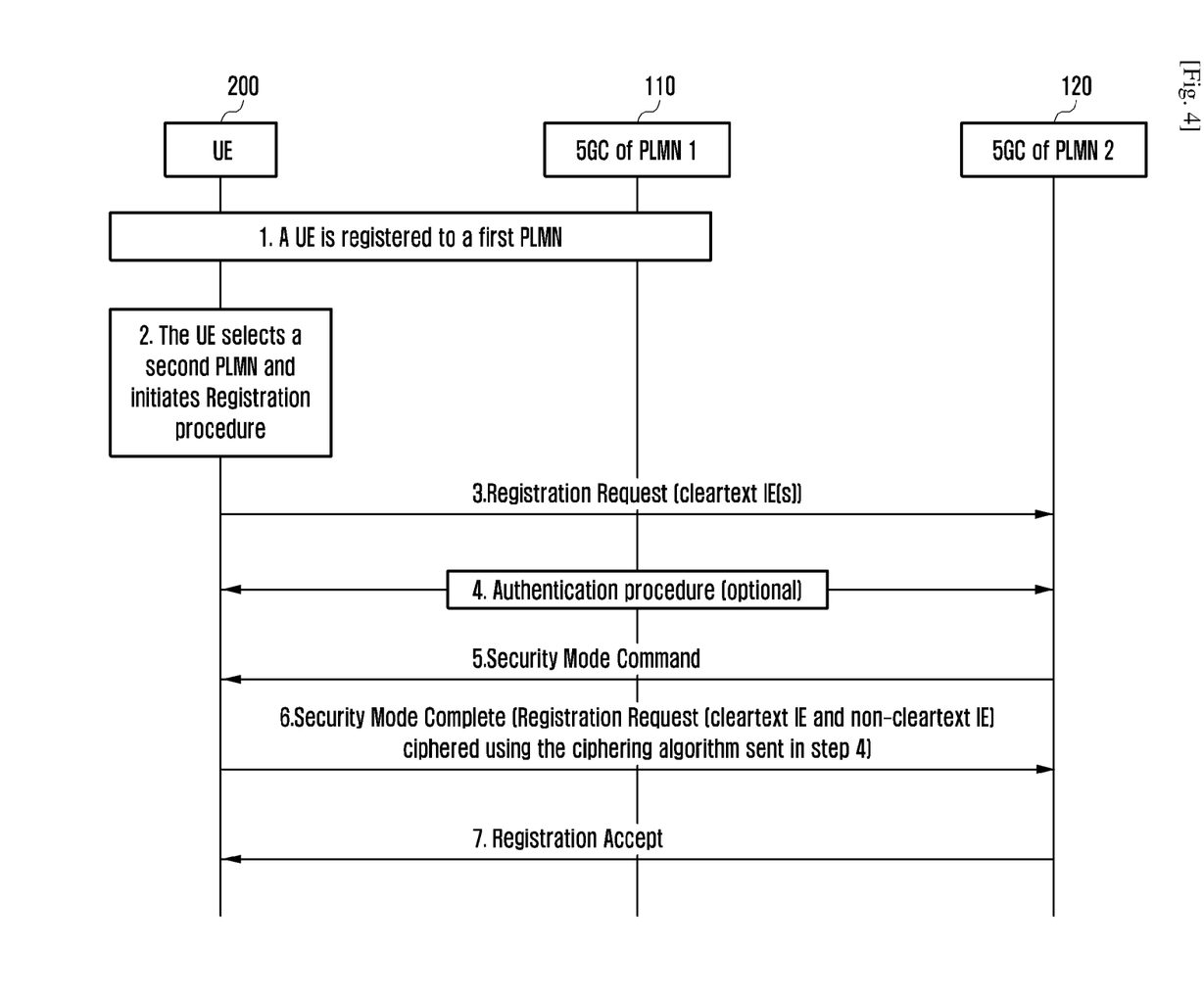
FIG. 4 is sequential diagram illustrating the initial NAS message protection procedure, according to the embodiments as disclosed herein.

FIG. 4 is sequential diagram illustrating the initial NAS message protection procedure, according to the embodiments as disclosed herein. As seen in FIG. 4, the detailed steps of the UE 200 initial NAS protection procedure are explained.

1. The UE 200 is registered to the first PLMN 110 and a first 5G NAS security context has been established.

2. The UE 200 selects a second PLMN 120 in 5GMM-IDLE mode.

3. The UE 200 send a registration request message with only cleartext IE to the second PLMN 120. The UE 200 initiates initial registration procedure when it is switched on the second PLMN 120. The UE initiates mobility and periodic registration update procedure when the UE 200 selects the second PLMN 120 from the first PLMN 110 while the UE 200 is switched on.

4. The second PLMN 120 may initiate and perform authentication procedure.

5. The second PLMN 120 initiates NAS Security mode control procedure and sends a security mode command message containing the selected NAS ciphering method to the UE 200.

6. The UE 200 sends entire the registration request message containing both cleartext IE(s) and non-cleartext IE(s) using the NAS ciphering method sent in the security mode complete message.

7. The second PLMN 120 send Registration Accept message.

The first 5G NAS security contexts, Cleartext IE(s), non-cleartext IE, the NAS ciphering methods are defined in embodiment 5. In one example the first PLMN 110 and the second PLMN 120 are non-equivalent PLMNs. In another example the first 110 PLMN and the second PLMN 120 belong to two different countries.

In another example embodiment, the UE 200 and the network executes steps 3-7, if the first 5G NAS security context consists of NULL ciphering (NEA0 in case of native 5G NAS security context or EEA0 in case of mapped 5G NAS security context after inter system change from S1 mode to N1 mode or UEA0 in case of mapped 5G NAS security context after intersystem change from Iu mode to N1 mode). When the first 5G NAS security context consists of NAS ciphering method which is other than the NULL ciphering method (NEA0) then the UE 200 in step 3 sends Registration Request message containing non-cleartext IE(s) ciphered with NAS ciphering method of the first 5G NAS security context.

Figure 5:
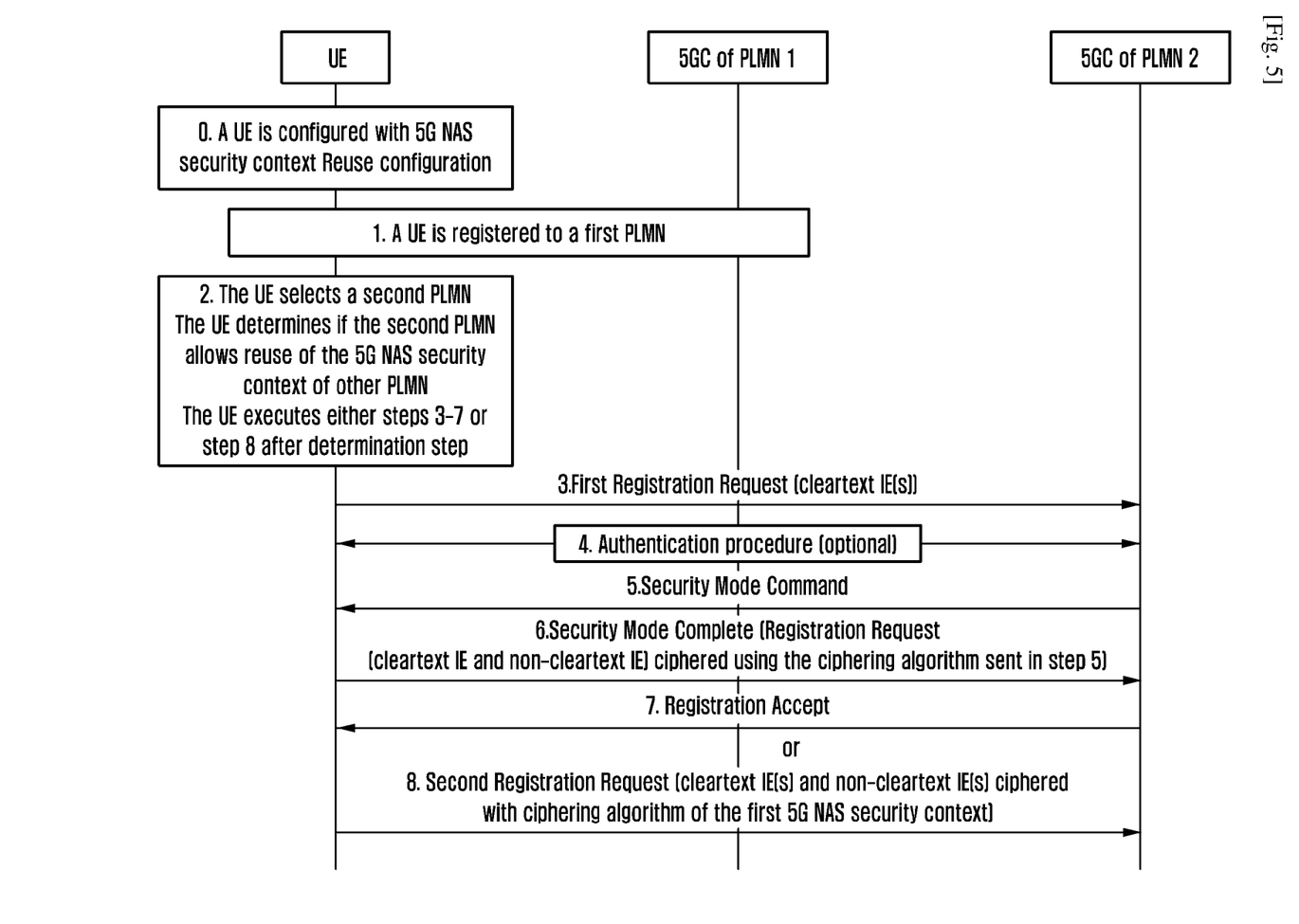
FIG. 5 is sequential diagram illustrating another embodiment of the initial NAS message protection procedure, according to the embodiments as disclosed herein.

FIG. 5 is sequential diagram illustrating the initial NAS message protection procedure, according to the embodiments as disclosed herein. The detailed steps of the initial NAS message protection are given below.

0. The UE 200 is provisioned with a 5G NAS Security context reuse configuration. The configuration consists of an entry which indicates whether a PLMN allows to use a 5G NAS security context created by another PLMN. This configuration is provisioned by the home PLMN or by the visited PLMN.

1. The UE 200 is registered to the first PLMN 110 and a first 5G NAS security context has been established.

2. The UE 200 selects the second PLMN 120 in 5GMM-IDLE state. The UE 200 determines whether the second PLMN 200 allows to reuse the 5G NAS security context of another PLMN by looking/checking the entry against the second PLMN 200 in the 5G NAS Security context reuse configuration. If the second PLMN 200 does not allow reuse of the 5G NAS security context of other PLMN then the UE 200 performs steps 3-7. If the second PLMN 120 allows the reuse of the 5G NAS security context of other PLMN in its PLMN then the UE 200 executes step 8. The UE 200 initiates initial registration procedure when it is switched on the second PLMN 120. This initiates mobility and periodic registration update procedure when the UE 200 selects the second PLMN 120 from the first PLMN 110 while the UE 200 is switched on.

3. The UE 200 sends initial registration procedure with only cleartext IE to the second PLMN 120.

4. The second PLMN 120 may initiate and perform authentication procedure.

5. The second PLMN 120 initiates NAS Security mode control procedure and sends a Security Mode Command message containing the selected NAS ciphering method to the UE 200.

6. The UE 200 sends the entire registration request message containing both cleartext IE(s) and non-cleartext IE(s) using the NAS ciphering method sent in the security mode complete message.

7. The second PLMN 120 send registration accept message.

8. The UE 200 sends registration request message to the second PLMN 120 containing both cleartext IE(s) and non-cleartext IE(s) ciphered with the NAS ciphering method present in the 5G NAS security context. The UE 200 and the second PLMN 120 perform the steps 4 to 7 above. In the step 6 the UE does not send any Registration Request message containing cleartext and non-cleartext IE in the Security mode complete message.

Figure 6:
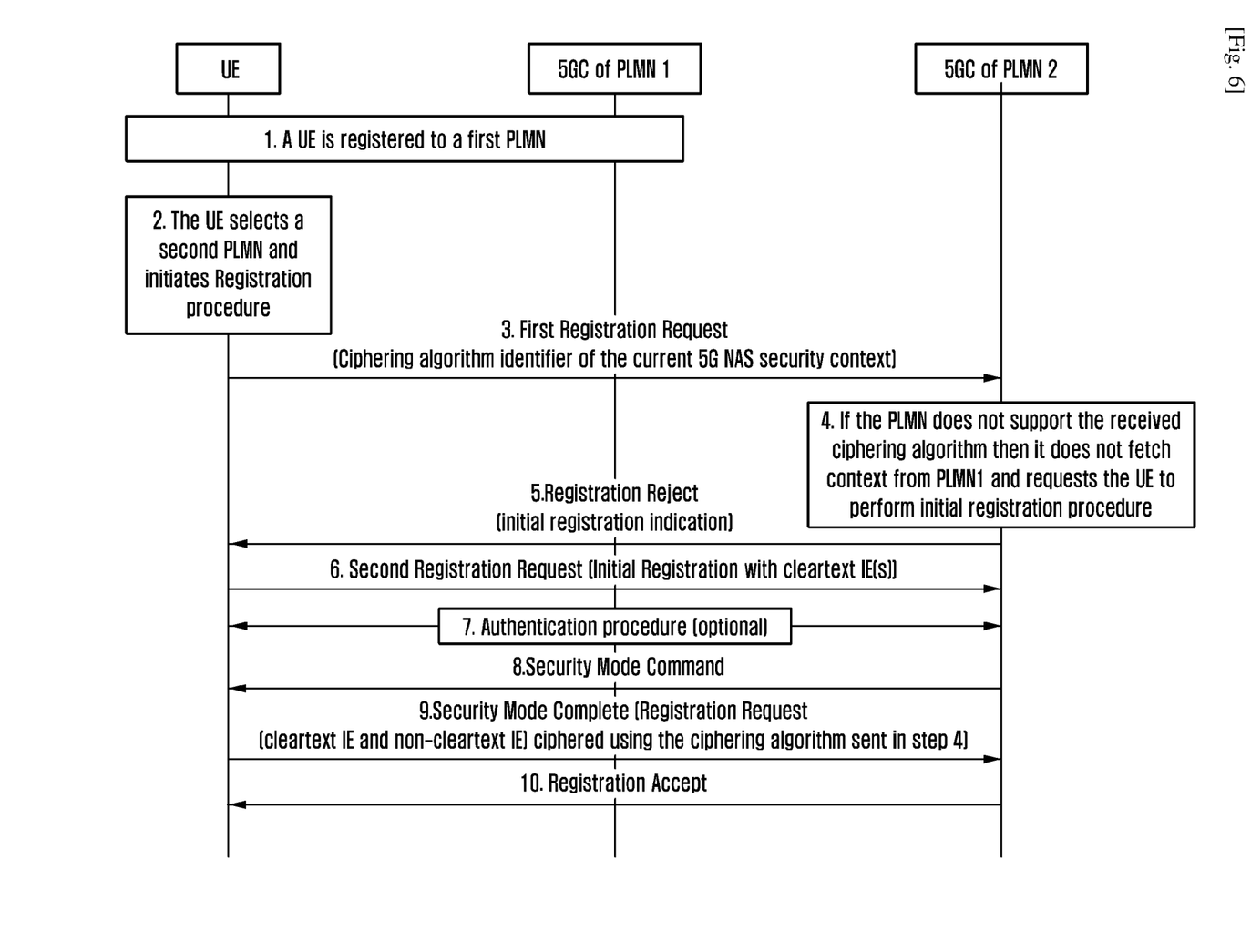
FIG. 6 is sequential diagram illustrating yet another embodiment the initial NAS message protection procedure if second the PLMN does not support the received ciphering algorithm, according to the embodiments as disclosed herein.

FIG. 6 is sequential diagram illustrating a handling of registration procedure on PLMN change, according to the embodiments as disclosed herein.

1. The UE 200 is registered to the first PLMN 110 and has established a 5G NAS Security context.

2. The UE selects the second PLMN 120 in 5GMM-IDLE state and initiates registration update procedure. The UE 200 initiates initial registration procedure when it is switched on the second PLMN 120. The UE 200 initiates mobility and periodic registration update procedure when the UE 200 selects the second PLMN 120 from the first PLMN 110 while the UE 200 is switched on.

3. The UE 200 sends registration request message containing the NAS ciphering method identifier of NAS ciphering method of 5G NAS security context to the second PLMN 120.

4. The second PLMN determines whether the second PLMN 120 supports the NAS ciphering method received in the registration request message. If the second PLMN 120 does not support the NAS Ciphering method or support the NAS ciphering method but is not allowed to use it then the second PLMN 120 does not fetch the UE 200 5GMM context from the first PLMN 110. The UE 200 sends a registration reject message indicating the UE 200 to delete the current 5GMM context and performs initial registration procedure. If the second PLMN 120 supports the NAS ciphering method received in the registration request message then the second PLMN 120 performs the registration update procedure as per the current 3GPP specification.

5. Upon receiving the registration reject message with an indication to delete the 5GMM context, the UE 200 deletes the 5GMM context and performs initial registration procedure.

6. The UE 200 initiates initial registration procedure and sends registration request with cleartext IE(s) only.

7. The second PLMN 120 executes an authentication procedure with the UE 200.

8. The second PLMN 120 then sends security mode command. The second 5G NAS security context is created at the UE 200 and the second PLMN 120.

9. The UE 200 sends security mode complete command containing the registration request with cleartext IE(s) and non-cleartext IE(s) ciphered with a new selected NAS ciphering method.

10. The second PLMN 120 sends registration accept message.

11. The UE 200 replies with registration complete message.

The following definitions applies to the all the above embodiments. EPC: Evolved Packet Core. It consists of MME, Serving Gateway (S-GW), Packet Gateway (P-GW), and other network node.

5GC: 5G Core Network consists of AMF, SMF, UPF and other core network nodes. 5G NAS security context: The key KAMF with the associated key set identifier, the UE security capabilities, the uplink and downlink NAS COUNT values. It also consists of NAS ciphering method and NAS integrity method. The 5G NAS security context is Native 5G NAS security context (this 5G NAS Security context is created as the result of a primary authentication and key agreement procedure between the AMF and the UE or mapped 5G NAS security context (this 5G NAS security context is created during Intersystem change from S1 mode to N1 mode or during the intersystem change from Iu mode to N1 mode).

Cleartext IEs: Information elements that can be sent without confidentiality protection in initial NAS messages.

Non-cleartext IEs: Information elements that are not cleartext IEs. When the initial NAS message is a REGISTRATION REQUEST message, the cleartext IEs are:

Extended protocol discriminator;
Security header type;
Spare half octet;
Registration request message identity;
5GS registration type;
ngKSI;
5GS mobile identity;
UE security capability;
Additional GUTI;
UE status; and
EPS NAS message container.

When the initial NAS message is a SERVICE REQUEST message, the cleartext IEs are:

Extended protocol discriminator;
Security header type;
Spare half octet;
ngKSI;
Service request message identity;
Service type; and
5G-S-TMSI.

The 5G NAS ciphering methods are NEA0, 128-NEA1, 128-NEA2. In all the above case the first and second PLMNs are non-equivalent PLMNs i.e. PLMNs which are not equivalent. In one example the first PLMN 110 and the second PLMN 120 belongs to the same country or different countries.

Figure 7:
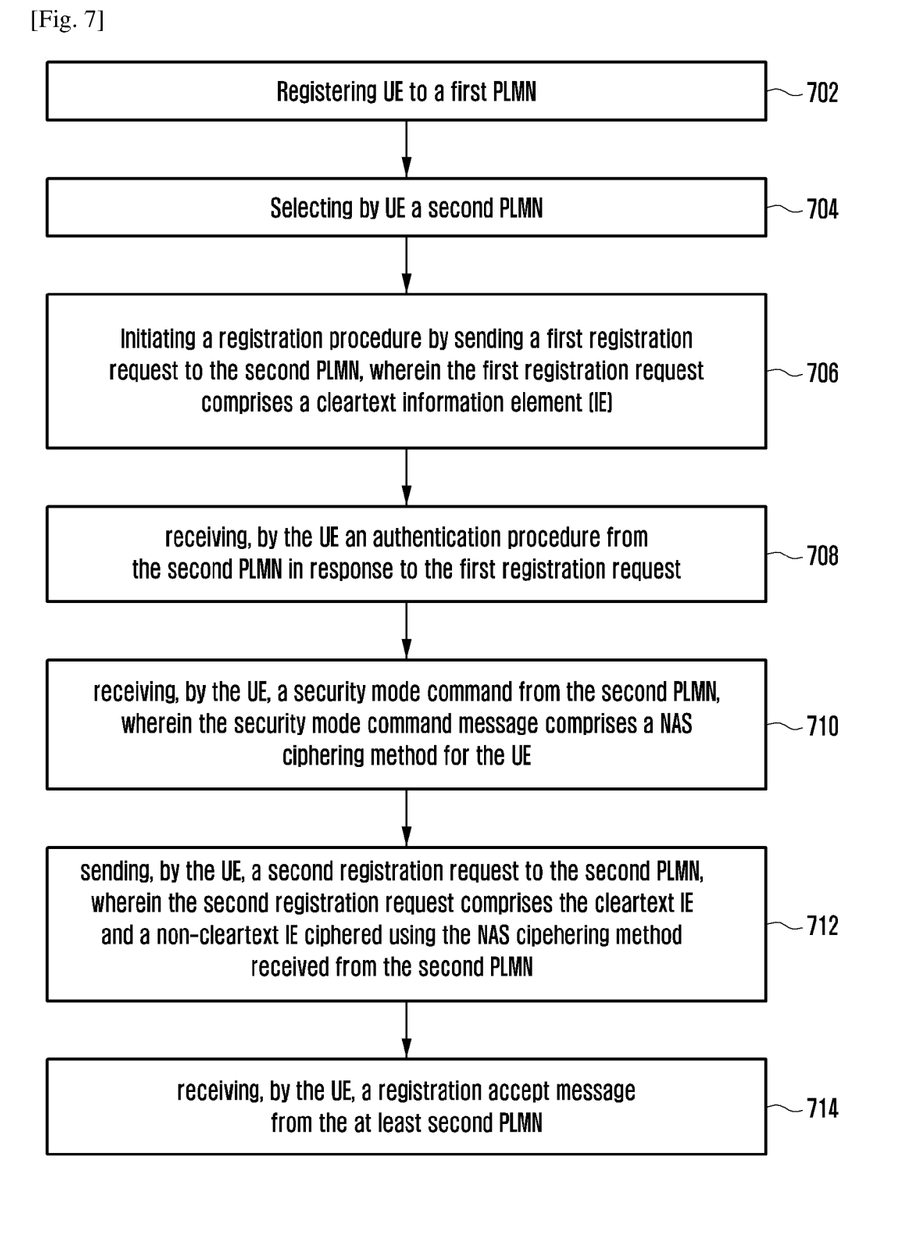
FIG. 7 is flow diagram illustrating the initial NAS message protection procedure, according to the embodiments as disclosed herein.

FIG. 7 is flow diagram illustrating the initial NAS message protection procedure, according to the embodiments as disclosed herein. As seen in FIG. 7, at 702 the method includes registering the UE 200 to the first PLMN 110. At 704, the method includes selecting by the UE 200 the second PLMN 120. At 706, the method includes initiating by the UE 200 a registration procedure by sending a first registration request to the second PLMN 120, wherein the first registration request comprises a cleartext information element (IE). In an embodiment the UE 200 determines that a 5G NAS security method selected is 5G-EA0.

At 708, the method includes receiving, by the UE 200, an authentication procedure from the second PLMN 120 in response to the first registration request. At 710, the method includes receiving, by the UE 200, a security mode command from the second PLMN 120, wherein the security mode command message comprises a NAS ciphering method for the UE 200.

At 712, the method includes sending, by the UE 200, a second registration request to the second PLMN 120, wherein the second registration request comprises a cleartext IE and a non-cleartext IE ciphered using the NAS ciphering method received from the second PLMN 120. At 714, the method includes receiving, by the UE 200, a registration accept message from the at least second PLMN 120.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 8A:
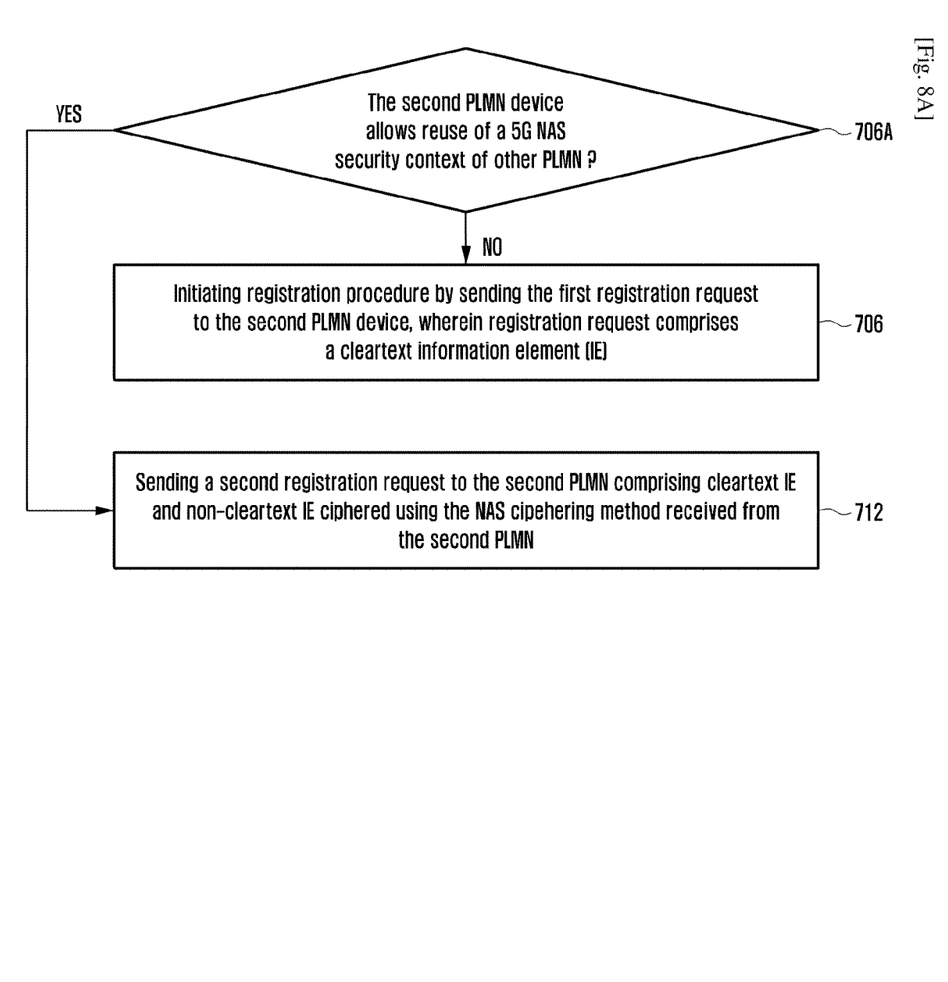
FIG. 8A is flow diagram illustrating an another embodiment of initiating the registration procedure, according to the embodiments as disclosed herein.

FIG. 8A is flow diagram illustrating an embodiment of initiating the registration procedure, according to the embodiments as disclosed herein. In an embodiment the method includes 702 the method includes registering the UE 200 to the first PLMN 110. At 704, the method includes selecting by the UE 200 the second PLMN 120.

After 704, the flow proceeds to 706A. At 706A, the method includes determining whether the second PLMN 120 allows reuse of a 5G NAS security context of any other PLMN. If the second PLMN 120 does not allows reuse of a 5G NAS security context, then the flow proceeds to 706. At 706, the method includes initiating by the UE 200 a registration procedure by sending a first registration request to the second PLMN 120, wherein the first registration request comprises a cleartext information element (IE). In an embodiment the UE 200 determines that a 5G NAS security method selected is 5G-EA0. Thereafter steps 708-714 are performed as it is.

At 708, the method includes receiving, by the UE 200, an authentication procedure from the second PLMN 120 in response to the first registration request. At 710, the method includes receiving, by the UE 200, a security mode command from the second PLMN 120, wherein the security mode command message comprises a NAS ciphering method for the UE 200.

At 712, the method includes sending, by the UE 200, a second registration request to the second PLMN 120, wherein the second registration request comprises a cleartext IE and a non-cleartext IE ciphered using the NAS ciphering method received from the second PLMN 120. At 714, the method includes receiving, by the UE 200, a registration accept message from the at least second PLMN 120.

In another embodiment, if the second PLMN 120 allows reuse of a 5G NAS security context, then the flow proceeds directly to 712 and then to 714. At, 712, the method includes sending, by the UE 200, a second registration request to the second PLMN 120, wherein the second registration request comprises a cleartext IE and a non-cleartext IE ciphered using the NAS ciphering method received from the second PLMN 120. At 714, the method includes receiving, by the UE 200, a registration accept message from the at least second PLMN 120.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 8B:
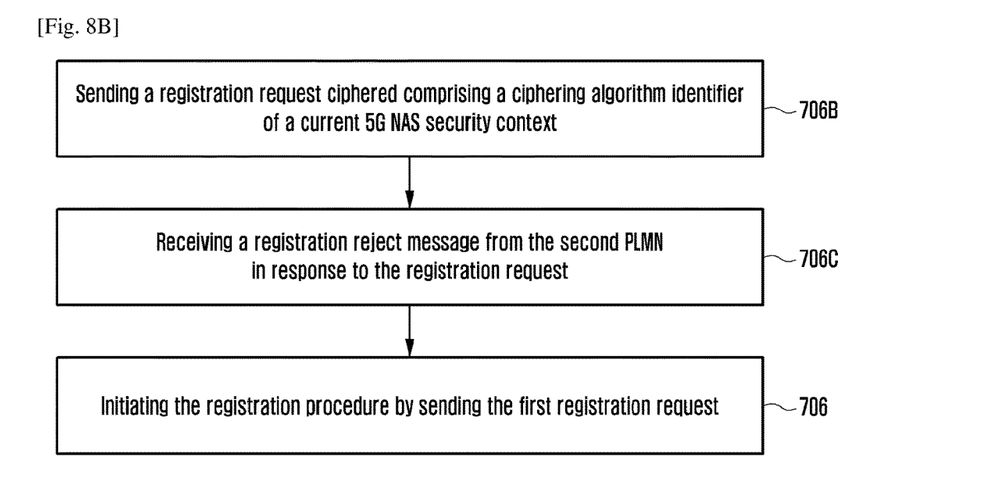
FIG. 8B is flow diagram illustrating another yet another embodiment of initiating the registration procedure, according to the embodiments as disclosed herein.

FIG. 8B is flow diagram illustrating another embodiment of initiating the registration procedure, according to the embodiments as disclosed herein.

In an embodiment the method includes 702 the method includes registering the UE 200 to the first PLMN 110. At 704, the method includes selecting by the UE 200 the second PLMN 120.

After 704, the flow proceeds to 706B. At 706B, the method includes sending, by the UE 200, a registration request ciphered comprising a ciphering method identifier of a current 5G NAS security context. Then the flow proceeds to 706C. At 706C, the method includes receiving, by the UE 200, a registration reject message from the second PLMN 120 in response to the registration request. At 706C, if the second PLMN 120 does not support the received ciphering algorithm then it does not fetch context from PLMN1 and requests the UE to perform initial registration procedure by sending the registration reject message.

The method then proceeds 706. At 706, the method includes initiating by the UE 200 the registration procedure by sending a first registration request to the second PLMN 120, wherein the first registration request comprises a cleartext information element (IE). In an embodiment the UE 200 determines that a 5G NAS security method selected is 5G-EA0. Thereafter steps 708-714 are performed as it is.

At 708, the method includes receiving, by the UE 200, an authentication procedure from the second PLMN 120 in response to the first registration request. At 710, the method includes receiving, by the UE 200, a security mode command from the second PLMN 120, wherein the security mode command message comprises a NAS ciphering method for the UE 200.

At 712, the method includes sending, by the UE 200, a second registration request to the second PLMN 120, wherein the second registration request comprises a cleartext IE and a non-cleartext IE ciphered using the NAS ciphering method received from the second PLMN 120. At 714, the method includes receiving, by the UE 200, a registration accept message from the at least second PLMN 120.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

All the claims and embodiments are also applicable to Standalone Non-Public Networks SNPN(s), when the UE selects one SNPN to another SNPN or when the UE selects between a SNPN and a PLMN. In one example the SNPNs has roaming agreements and in another example the SNPN has no roaming agreements.

The invention claimed is:

1. A method for providing Non-Access Stratum (NAS) message protection, the method comprising:
   registering a User Equipment (UE) to a first Public Land Mobile Network (PLMN);
   selecting, by the UE a second PLMN; and
   initiating, by the UE, a registration procedure with the second PLMN by sending a first registration request to the second PLMN, wherein the first registration request comprises only cleartext information elements (IEs),
   wherein the first registration request comprises only the cleartext information IEs when the UE determines that a 5G NAS security method selected by the first PLMN for the UE is 5G-EA0, and
   wherein initiating the registration procedure comprises:
      determining, by the UE, whether the second PLMN allows reuse of a 5G NAS security context established in another PLMN, wherein the UE is configured with the 5G NAS security context reuse configuration; and
      performing, by the UE, one of:
         initiating the registration procedure by sending the first registration request to the second PLMN, wherein the first registration request comprises only the cleartext IEs in response to determining that the second PLMN does not allow reuse of the 5G NAS security context established in the other PLMN, and
         sending a second registration request to the second PLMN, wherein the second registration request comprises the cleartext IEs and non-cleartext IEs ciphered using a ciphering method of the 5G NAS security context, in response to determining that the second PLMN allows reuse of the 5G NAS security context established in the other PLMN.

2. The method as claimed in claimed in claim 1, further comprising:
   receiving, by the UE, an authentication request message from the second PLMN in response to the first registration request;
   receiving, by the UE, a security mode command message from the second PLMN wherein the security mode command message comprises a NAS ciphering method for the UE;
   sending, by the UE, the second registration request to the second PLMN, wherein the second registration request comprises the cleartext IEs and non-cleartext IEs ciphered using the NAS ciphering method received from the second PLMN; and
   receiving, by the UE, a registration accept message from the second PLMN.

3. A wireless system for providing Non-Access Stratum (NAS) message protection, the system comprising:
   a first Public Land Mobile Network (PLMN);
   a second PLMN; and
   a UE, wherein the UE comprises:
      a memory,
      a processor, and
      a communicator,
      wherein the processor is configured to:
         register the UE to the first PLMN;
         select the second PLMN; and
         initiate a registration procedure with the second PLMN by sending a first registration request to the second PLMN, wherein the first registration request comprises only cleartext information elements (IEs),
   wherein the first registration request comprises only the cleartext information IEs when the processor determines that a 5G NAS security method selected by the first PLMN for the UE is 5G-EA0, and
   wherein, to initiate the registration procedure, the processor is further configured to:
      determine whether the second PLMN allows reuse of a 5G NAS security context established in another PLMN, wherein the UE is configured with the 5G NAS security context reuse configuration; and
      one of:
         to initiate the registration procedure, send the first registration request to the second PLMN, wherein the first registration request comprises only the cleartext IEs in response to determining that the second PLMN does not allow reuse of the 5G NAS security context established in the other PLMN, and
         send a second registration request to the second PLMN, wherein the second registration request comprises the cleartext IEs and non-cleartext IEs ciphered using a ciphering method of the 5G NAS security context, in response to determining that the second PLMN allows reuse of the 5G NAS security context established in the other PLM N.

4. The wireless system as claimed in claim 3, wherein the processor is further configured to:
   receive an authentication request message from the second PLMN in response to the first registration request;
   receive a security mode command message from the second PLMN, wherein the security mode command message comprises a NAS ciphering method for the UE;
   send the second registration request to the second PLMN, wherein the second registration request comprises the cleartext IEs and non-cleartext IEs ciphered using the NAS ciphering method received from the second PLMN; and
   receive a registration accept message from the at least second PLMN.

* * * * *

UNITED STATES PATENT AND TRADEMARK OFFICE
CERTIFICATE OF CORRECTION

| | | |
|---|---|---|
| PATENT NO. | : 11,785,450 B2 | Page 1 of 1 |
| APPLICATION NO. | : 17/605549 | |
| DATED | : October 10, 2023 | |
| INVENTOR(S) | : Tiwari et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 128 days.

Signed and Sealed this
Eighth Day of July, 2025

Coke Morgan Stewart
*Acting Director of the United States Patent and Trademark Office*